Jan. 8, 1957     J. C. R. KELLY, JR., ET AL     2,776,887

PREPARATION OF MOLYBDENUM

Filed Aug. 22, 1952     2 Sheets—Sheet 1

INVENTORS
J. C. R. KELLY, Jr.
and A. G. CATERSON.
BY
ATTORNEY

Jan. 8, 1957  J. C. R. KELLY, JR., ET AL  2,776,887
PREPARATION OF MOLYBDENUM
Filed Aug. 22, 1952  2 Sheets-Sheet 2

INVENTORS
J. C. R. KELLY, Jr.
and A. G. CATERSON.
BY
ATTORNEY

2,776,887

PREPARATION OF MOLYBDENUM

John C. R. Kelly, Jr., Upper Montclair, and Alan G. Caterson, Cranford, N. J., assignors to Westinghouse Electric Corporation, East Pittsburgh, Pa., a corporation of Pennsylvania Application August 22, 1952, Serial No. 305,806

4 Claims. (Cl. 75—211)

This invention relates to an improved method of preparing molybdenum whereby such having improved properties is obtainable.

The principal object of our invention, generally considered, is to improve the physical properties of molybdenum, while obtaining as high or higher purity.

Another object of our invention is the production of molybdenum powder having a sufficiently large particle size, greater than that produced by conventional methods, so that it is not affected by moisture, oxygen or nitrogen in the atmosphere, and is, therefore, stable in air, and has the proper pressing and sintering characteristics, allowing for the preparation of sintered ingots having a greater malleability than heretofore.

A further object of our invention is to prepare molybdenum powder without forming hard lumps, and thereby avoid a subsequent crushing operation, as well as facilitating screening.

A still further object of our invention is to produce molybdenum powder from the dioxide or trioxide doped with a soluble polar organic compound of a reducing nature whose composition is limited to carbon, hydrogen and oxygen, whereby a powdered product is obtained in which at least 10% of the particles have an ultimate size of two microns or larger, as compared with conventional molybdenum powder which has less than 1% of the particles that large.

Another object of our invention is to produce molybdenum in pure dense coherent form by pressing to shape and sintering alternately in hydrogen and a vacuum.

A further object of our invention is to produce molybdenum in pure dense coherent form by adding to the material, preferably after the first reduction of molybdenum trioxide or ammonium molybdate, but prior to the final conversion to coherent metal, a soluble polar organic compound of a reducing nature whose composition is limited to carbon, hydrogen and oxygen, in order to obtain a product with an atomic dispersion of carbon, correspondingly free from oxygen.

Other objects and advantages will become apparent as the description proceeds.

Referring to the drawing.

Figure 1:
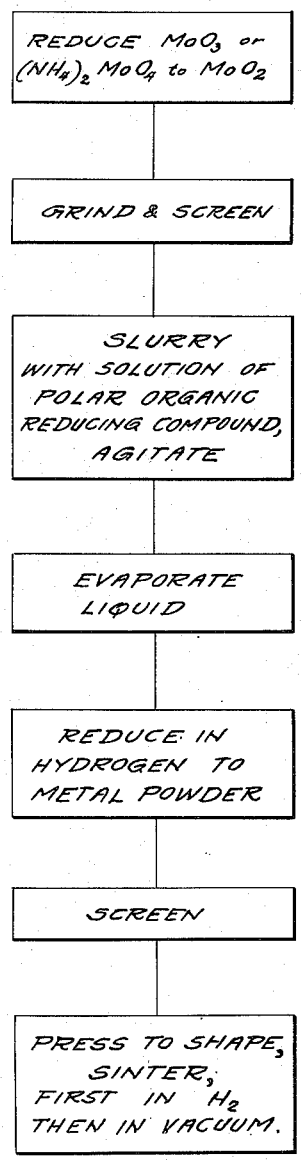
Figures 1 and 2 are flow diagrams of two embodiments of our invention.

The manufacture of molybdenum metal powder is generally effected by successive hydrogen reduction, starting with either molybdenum trioxide of ammonium molybdate. In the two-step process currently followed, such compounds are first converted into molybdenum dioxide, a red lumpy powder. This dioxide is then reduced to metal powder in hydrogen at high temperatures.

Prior to our invention, it has been found necessary to reduce the dioxide for five hours at a temperature of about 1100° C. The time-temperature cycle is governed by two considerations; first, completeness of reduction; second, to provide a metal of a sufficiently large particle size so that it will be stable in air and have the proper pressing and sintering characteristics.

The disadvantage of the commercial method is that the resultant metal powder is fritted together in hard lumps, and must be crushed or ground, and then laboriously passed through 200 mesh screens before it can be pressed and sintered. This is an expensive operation and one believed to result in contamination.

Even after such grinding and screening, the metal powder commercially produced, when converted to coherent metal does not have the proper grain growth characteristics, which should be those of a pure metal. Because of this, it is extremely difficult to exercise the proper metallurgical control over the grain size, not only when sintering, but during various annealing operations necessary to fabrication.

In accordance with our invention, we propose to treat either the trioxide of molybdenum, ammonium molybdate, or the dioxide of molybdenum, after passing through a relatively large screen, such as 40 mesh, and suspended in water to produce a slurry, with a soluble polar organic or carbonaceous reducing agent, such as acetic or other organic acid which will similarly decompose at elevated temperatures in order to take part in the reduction of the compound to molybdenum metal powder, having the following desired characteristics.

1. The metal powder produced according to our invention, after a standard hydrogen reduction at 1100° C., comes out of the furnace as free flowing powder, retaining a small proportion of atomically-dispersed carbon which is beneficial during subsequent sintering operations.

2. The particle size of the metal powder, produced by our method, is greatly increased, as compared to standard powder for any given reduction cycle.

Our invention specifically consists in taking desirably molybdenum dioxide, that is, the raw material after the first reduction but prior to the final conversion to metal, suspend it in water to make a slurry, and add acetic acid thereto. The amount of acetic acid which gives an effect which may be optimum in connection with the particular steps which we employ, has been found to be 2 cc. of glacial acetic acid per kilogram of contained metal in the slurry, or a corresponding proportion of one of the other organic or carbonaceous reducing agents. By this we mean, that the amount of polar organic compound to be used depends on the particular structure of the compound and on the particle size of the oxide or metal which is treated.

For the case of homologous series of monobasic acids, we may use the same molar quantity as for acetic acid, since although they may contain more carbon, they can not make as effective use of the carbon they do contain.

For compounds less polar or those in lower oxidation state, i. e. aldehydes or alcohols, it is necessary to use a larger molar proportion of the compound.

In laboratory experiments, no injurious results have been observed from the use of a gross excess. However, there are circumstances where, in production, a gross excess would be undesirable.

Recommended quantities, which may be optimum for some of the alternatives are:

13 cc. of stearic acid per kilogram of contained metal.
20 cc. of ethyl alcohol per kilogram of contained metal.
10 cc. of acetaldehyde per kilogram of contained metal.

The mixture is then agitated to thoroughly intermix the additive with the powder. The mixture is then heated to about 100° C. to, as shown by Fig. 1 of the drawing, evaporate the liquid and leave the oxide dried and doped to the desired extent, ready for reduction.

The mixture may then be reduced in a conventional manner or at lower temperatures, as between 1100° C. and 800° C. for from 2 to 6 hours, it being understood generally that lower temperatures require longer times to effect complete reduction. To make coherent metal from the powder it is necessary to merely pass through a 200 mesh screen (or alternatively through one of larger mesh to merely remove gross impurities), press into ingots, sinter and work in accordance with conventional practice. The metal powder produced has two characteristics which are distinctly different from such produced by commercial methods.

1. The metal powder does not frit together and, therefore, may be readily passed through 200 mesh screens immediately upon removal from the furnace, without crushing or grinding.

2. At least 10% of the particles have an ultimate size of two microns or larger, even when the reduction has been performed for only two hours at 1000° C., as compared with the conventional reduction cycle of 5 hours at 1100° C.

3. The particles, in addition to their larger ultimate size, have a more favorable, i. e., smaller, surface to volume ratio.

As contrasted with the above, molybdenum powder produced by conventional or commercial methods has less than 1% of the ultimate particles as large as 2 microns, and most of the particles have an unfavorable, i. e., larger surface to volume ratio. Also, when sintered the molybdenum ingots made from doped powder have a larger grain size than usually observed for similar sintering cycles, suggesting that the metal has a grain growth more normal than that produced by commercial methods.

We explain the non-fritting characteristics and increased ultimate particle size by the fact that the acetic acid, or other carbonaceous compound, wets all of the oxide particles in the slurry. At reduction temperatures, the acid decomposes providing carbon atoms at the surface of each particle. This carbon coating exerts a cleaning action, reducing oxide films on the particle surface which are not normally reduced by the hydrogen in the usual operation. This atomically-dispersed carbon film, which is a very small proportion of the total mass, none the less prevents fritting of the metal powder during the reduction process, but by virtue of its elimination of oxides facilitates sintering at high temperatures.

In ordinary reductions, without the cleansing action of carbon, growth is restricted so that the ultimate particle size is much finer. Due to the resultant tremendous surface areas of these particles, they are thermodynamically unstable and tend to cling together, forming clusters in trying to reach a lower energy state. This clinging together results in fritting, so that the metal powder formerly produced had hard visible lumps which required crushing. In powder produced from the doped oxide, the large ultimate particles have atomically-dispersed carbon films thereon, and show no tendency to cling together. They, therefore, come out of the furnace as free-flowing powder.

The paradoxical features of this new powder, that is, fine aggregate particle size but large ultimate particle size, are both explained by the cleaning action of the carbon during reduction. Also, the carbon retained by the powder prior to sintering has an ultimate cleansing action during sintering, since more oxide may be reduced by it than by hydrogen alone. Decarbonization does not take place at a sufficient rate during reduction to remove a substantial proportion of carbon because the temperature is too low.

Figure 9:
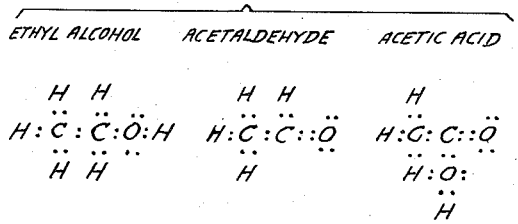
Figure 9 are electronic formulae, according to notation of Gilman, "Organic Chemistry," John Wiley & Sons, second edition, page 1832 et seq.
Figure 7:
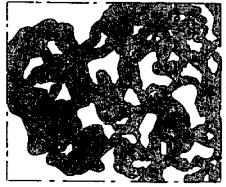
Figure 7 is an electron micrograph, showing the grains of molybdenum powder, as produced by the conventional method, magnified 10,000 times.

Careful metallographic and chemical examination of sintered ingots produced from powder prepared in accordance with our invention shows no injurious carbides present when sintering is complete. However, in order to avoid this carbide formation, it is necessary to introduce the carbon in the form of a carbonaceous liquid, rather than as lamp black or carbon in some bulk form. Although acetic acid has been mentioned as preferred, yet any soluble polar organic compound of a reducing nature, whose composition is limited to carbon, hydrogen and oxygen, examples, in addition to acetic acid, being stearic, oxalic and citric acids, aldehydes and alcohols. Three formulas for such compounds aer illustrated in Fig. 9, the dots adjacent the atom symbols representing associated electrons. That is, classes of compounds suitable for such doping are all of those where the oxygen atoms are connected to the carbon atoms by a "double bond," i. e., they are unsaturated and the electron envelope is not uniform. The carbon atoms are therefore, attracted to metal, or an oxide coating thereon, in order to produce a balanced electronic distribution. This makes it possible to retain the compound, in the material doped therewith, even at temperatures above the boiling point thereof, long enough to crack, degrade or decompose adjacent $CH_2$ or $CH_3$ groups to carbon.

Suitable liquids for making the slurry are such as will dissolve the carbonaceous or organic compound and not introduce undesirable material. Water and the liquid alcohols are mentioned as examples.

Carbon, however, cannot be introduced as lamp black or free carbon because it is insoluble and the particle sizes are too large. In the case of lamp black, for example, the carbon particles are about 0.1 to 1 micron in diameter, too close in size to that of the molybdenum dioxide. Therefore, in using free carbon, only two alternatives, both undesirable, are available.

a. Employ large quantities of lamp black to allow for good distribution of carbon, with the resultant undesirable contamination, or b. Use only small quantities of lamp black, where one carbon particle must provide reducing conditions for several thousand molybdenum dioxide particles.

By providing for atomic dispersion of carbon as liquid, by the process herein described, we eliminate the difficulties and objections to using free carbon.

From the foregoing, it will be seen that our employment of a doped molybdenum compound results in the following important economies in the manufacture of molybdenum.

1. A crushing operation prior to sintering of the metal powder produced is eliminated.

2. The screening operation of the powder is changed and made very much faster and easier. The metal powder produced from the doped oxide gives the same result on the Fisher sub-sieve sizer before and after passing through a 200 mesh screen. Screening can, therefore be reduced to that which is necessary to eliminate gross impurities.

3. Since a given time-temperature reduction cycle will give a larger ultimate particle size, the use of the doped oxide permits lower temperatures and/or shorter times to be used in reduction.

4. The larger particle size of the metal contributes to a greater purity, better control of grain size, and improved malleability of the consolidated powder.

Figure 2:
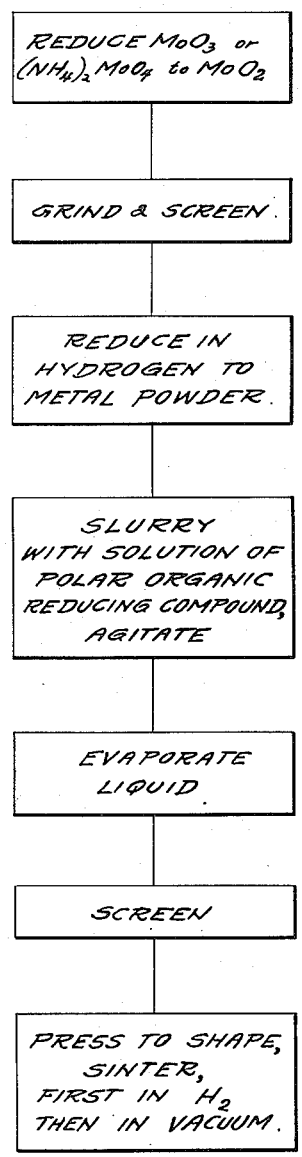

After having disclosed one way of introducing an atomic dispersion of carbon into material for making molybdenum powder, we now turn to an alternative method for effecting the desired result. This method is in accordance with the flow diagram of Fig. 2 and includes the introduction of a carbonaceous doping agent at a different point in the sequence of steps. Before discussing this alternative in detail, a general review of the art will be undertaken.

The only commercial schemes employed today for the manufacture of large plastic objects of molybdenum metal are:

1. Arc-casting (in a vacuum or inert atmosphere) wherein molybdenum metal powder, slightly fritted, is melted at the temperatures of the electric arc, in a water cooled copper crucible producing an ingot of metal which has been fused and solidified in what amounts to a thin refrigerated shell of molybdenum metal.

2. Powder-metallurgy, wherein molybdenum metal powder is mechanically, hydraulically or hydrostatically pressed or formed into a desirable shape, and subsequently sintered at temperatures of from 1000° C. to 2640° C. (its melting point) in an atmosphere of hydrogen or in a vacuum, the energy being provided by a resistance furnace, resistive heating of the sample (bottle-treating), or induction heating.

The following facts will be noted:

(a) Molybdenum metal powder is common to both processes (b) Molybdenum metal powder, as freshly prepared, contains 0.06 to 0.1% by weight of oxygen acquired by atmospheric contamination upon removal from reducing furnaces.

(c) It has been observed that molybdenum metal is difficult or impossible to plastically deform if it contains more than 0.006% to 0.01% by weight of oxygen.

(d) Therefore a deoxidant is essential in both of the aforementioned manufacturing techniques.

In the arc-casting process deoxidation is achieved with carbon which must be added in excess of stoichiometric quantities in order to be effective in reducing oxygen content from 0.1% to 0.006% or less. The carbon is added as carbon powder or as a concentrated mixture of carbon with molybdenum. Two undesirable conditions result:

(a) The excess, or residue of carbon amounts to 0.020% weight or more.

(b) In spite of the excess, the first melting yields oxygen levels only slightly below the tolerable limit, i. e., 0.003%–0.006% by weight. Further remelting lowers the value but at great expense.

An additional disadvantage of the arc process is the extremely large, columnar grain size of the resulting ingot; this condition demands careful and expensive labor in reducing the size of the ingot, and the size of the grains to useful ranges.

In the powder metallurgy process we may make the following observations:

(a) During reduction of $MoO_2$ to Mo powder, great pains are taken to insure the ingress and egress of $H_2$ to all portions of the reduction vessel. Sufficient time is allowed and the $MoO_2$ is not too densely packed. The apparent density of the metal powder so produced is about 1 to 2 g./cc., giving a measure of its porosity (when compared with dense metal, density 10.3 g./cc.).

(b) During sintering of the pressed compact of 99.9% $Mo+0.1\%$ $O_2$, the pressed piece is at density 6.0 g./cc. and quickly reaches 9.0 g./cc. (10.2 is theoretical). Hydrogen must now penetrate the mass and $H_2O$, product of reduction, must escape. Also at 1600–2400° C., customary sintering temperatures, we may observe that either (i) Water is partially decomposed into its elements, $H_2O = H_2 + \frac{1}{2}O_2$, thereby lowering the reducing character of $H_2$ or (ii) The thermodynamic criteria governing, $$MoO_2 + 2H_2 = Mo + 2H_2O$$

are less favorable than they were at 1100° C.

Thus not only is the effectiveness of $H_2$ as a reducing atmosphere reduced, but also the escape of water vapor is difficult and, therefore, the law of mass action causes the reaction above to be suppressed. Thus the end result of most powder-metallurgy sintering contains 0.005–0.006% $O_2$, at the borderline of usefulness.

Since conventional hydrogen reduction lowers the oxygen content to 0.006%, it might seem that this material was sufficiently free of oxygen. But molybdenum has a vanishingly low solubility for oxygen and the oxide is present as a brittle film in the grain boundaries, which makes it very harmful. Because of the technique by which the grain size of the powder metallurgy molybdenum may be controlled, and the skill developed over the years in fabricating techniques, the harmful character of the oxide content has been lessened. However, any quantity above .001% must be considered highly undesirable. It has been postulated that such small amounts of oxygen, nitrogen and carbon are responsible for the abrupt transition from ductile to brittle fracture at sub-normal temperatures or accelerated strain rates.

Because of this, many efforts have been made to further deoxidize powder metallurgy and arc-cast molybdenum. These may be divided into three groups—

1. Use of such materials as zirconium, aluminum and thorium which would form a compound of the added metal with oxygen, more stable than molybdenum dioxide, and leave the oxygen in the ingot in a less injurious form. Such techniques have the obvious disadvantage of leaving a contaminated, two-phase system, rather than a pure metal. Further, experimental results have generally failed to produce a softer or more malleable metal.

2. Taking extraordinary precautions to provide very dry hydrogen as a sintering atmosphere. These experiments include using liquid air, calcium hydride, or a palladium coil to dry the incoming hydrogen. Such efforts have proved impractical, particularly in the case of ingots of large cross sections. At temperatures high enough for sintering, water vapor, the reaction product in the reduction, is unstable and breaks down to its components. Now even though perfect reduction conditions may be maintained at the surface of the ingot, the oxygen must diffuse out. The diffusion of such oxygen is necessarily painfully slow because of the low solubility of oxygen in molybdenum. Low solubility prevents the establishment of high concentration gradients, thus preventing rapid diffusion as discussed by Barrer and others.

3. Previous attempts to de-oxidize with carbon. They have been completely unsuccessful because the carbon was introduced as lamp black or some such bulk form of carbon.

The object of this procedure is to provide a powder metallurgy molybdenum metal which will be lower in injurious oxides than any previously produced as a result of carbon deoxidation, and will further result in a final product as pure or purer in respect to carbon than conventional powder metallurgy molybdenum (and lower by a factor of 10 than arc-cast).

This improvement consists in adding a carbonaceous compound (liquid or capable of being used as a liquid as in solution) such as acetic acid, or one of the alcohols, or a similar compound containing oxygen, hydrogen and carbon, which will be absorbed on an oxide of molybdenum prior to one of the reduction steps, or adsorbed on an oxide coated particle of the metal, which will provide carbon in atomic dispersion after the thermal decomposition of the compound. This carbon will, during reduction and sintering, deoxide molybdenum to an extent not possible by conventional processing.

It is to be clearly understood that this does not mean an alloy, since the amount of carbon retained in the final metal is as low or lower than conventional powder metallurgy molybdenum, and considerably lower than arc-cast molybdenum. This differs from the method of deoxidizing with carbon used in the arc-casting process in the following essential respects:

1. The method applies to powder metallurgy molybdenum and the deoxidized product retains all the particular advantages of a powder metallurgy product. these are
    (a) Control of grain size
    (b) Variety of sizes and shapes in the as-sintered condition
    (c) Avoidance of columnar structure requiring prefabrication for its elimination.

2. The addition of carbon in the arc casting process depends on the carbon being present at very high temperatures. At such temperatures the rate of carbon diffusion is sufficiently great so that carbon can act as an effective de-oxidant. At lower temperatures such a particle of carbon would only deoxidize molybdenum immediately surrounding it. Our process consists in deliberately adding the carbon so that an atomic dispersion will result. Since our methods succeed in putting the carbon where it is needed, the deoxidation is effective in the range of conventional sintering temperatures for molybdenum, 1600° C. to 2200° C.

3. The method also succeeds in adding only that amount of carbon required since careful control over quantity added is possible through choice of volume and character of carbonaceous additive. Also it is believed that the additive is only adsorbed on oxide films or sites on a 1:1 basis. (Since the arc-casting process also employs P. M. Mo as a starting point the additive technique is also applicable there.)

TABLE 1

*Analytical data to support the validity of the observations*

| Description of Sample | Percent $O_2$ | Percent C | Hardness | Comment |
|---|---|---|---|---|
| A1-2F (doped with carbonaceous liquid, sintered in normal factory process). | .0043 avg. of 2. | .0063 avg. of 2. | 160 | Normal. |
| A1-2FV (same as above but resintered in vacuum to remove oxygen as CO). | .0012 avg. of 2. | .0028 | 130 | (¹) |

¹ Lower hardness than ever reported in literature for any grade of Mo.

We now come to a preferred method of sintering molybdenum powder, preferably produced in accordance with one of the foregoing methods.

Specifically, our invention consists in a combination of hydrogen and vacuum sintering. The hydrogen is used at those temperatures at which thermodynamics tell us it will be most effective as a reducing agent. The method uses no more hydrogen than is necessary. The ingot is then sintered under clean sintering conditions so that no loss of purity is suffered by the surfaces freshly cleaned by hydrogen. A cyclic pressure-vacuum technique is used; hydrogen is pumped in and out during the early stages of the cycle.

Figure 3:
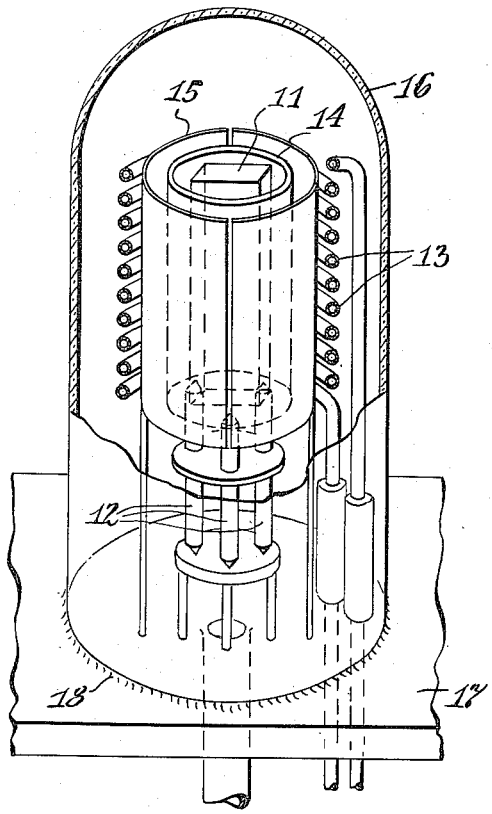
Figure 3 is an elevational view of apparatus which may be used in the practice of our invention.
Figure 4:
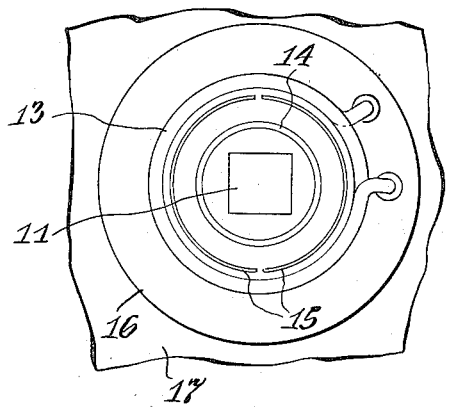
Figure 4 is a plan of the apparatus of Figure 3.
Figure 5:
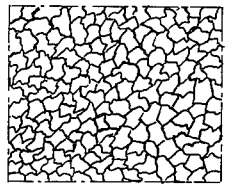
Figure 5 is a photomicrograph, showing the grains of molybdenum, as sintered by the conventional method, magnified 250 times.

A vacuum system, similar to the one shown in Figs. 3 and 4 is used. The piece or ingot 11 is mounted on a three point tungsten support 12, with the base of the piece slightly above (or beyond) the lowest turn of the heating coil 13. The ingot is desirably enclosed in a molybdenum crucible or sleeve 14, in turn surrounded by a preferably tantalum radiation shield 15. The cycle used may be as follows:

The vacuum system is pumped down to less than 0.1 mm. in the bell jar or envelope 16, desirably formed of 96% silica glass, sold by Corning Glass Works under the trademark "Vycor," glass identified by the trademark "Pyrex," quartz, or the like, sealed to the table or support 17, as indicated at 18, and a low heat, about 600–800° C. is applied to the ingot to help degas the system. When the pressure falls better than $10^{-4}$ microns this step is complete. Hydrogen dried through liquid nitrogen is passed into the system until a pressure of 250 millimeters is reached (about ⅓ atmosphere). Then the hydrogen is pumped out until the pressure is reduced to $10^{-3}$ mm. This is repeated until no further hydrogen is required.

The point at which the hydrogen is no longer needed can be easily detected by noting the pumping speed of the system. Pure hydrogen is pumped off faster than hydrogen with water vapor.

The following data observed in one of the runs will illustrate this:

TABLE 2

| Elapsed Pumping Time for Range $10^{-1}$ to $10^{-3}$ mm. Hg | | Elapsed Pumping Time for Range $10^{-1}$ to $10^{-3}$ mm. Hg | |
|---|---|---|---|
| Number of Cycles | time, sec. | Number of Cycles | time, sec. |
| 1 | 79 | 8 | 37 |
| 2 | 57 | 9 | 34 |
| 3 | 51 | 10 | 32 |
| 4 | 49 | 11 | 30 |
| 5 | 45 | 12 | 28.5 |
| 6 | 42.5 | 13 | 28 |
| 7 | 37 | 14 | 26 |
|  |  | 15 | 25 |

When the pumping speed of the system is observed to be approximately equal to the speed observed for pure dry hydrogen, no further gas is used. The sample is heated rapidly to sintering temperature (1500–2400° C.) and held the desired length of time at a pressure of $10^{-5}$ millimeters.

The data below shows the rapid densification and grain growth of molybdenum achieved at a temperature of approximately 1850° C.

TABLE 3

| Time | Density | Hardness, VPN | Grain Count |
|---|---|---|---|
| 30 min | 9.62 | 150 | 2,325 |
| 105 min | 9.75 | 155 | 1,793 |
| 185 min | 9.90 | 157 | 1,370 |
| 240 min | 9.92 | 150 | 900 |

This method of sintering has been successfully employed. There is nothing inherent in the method which prevents its use on a large scale. To sinter a 3″ square ingot, 12″ long, requires a much larger coil, a considerably larger vacuum system, and a ingeniously designed system of supports and radiation shields. The power necessary depends on the ability to make the set up with a minimum heat loss by radiation and by a minimum undesired heating of the shields and supports. Since hydrogen is only used in the early stages, this would result in savings of hydrogen.

However more important than any economic considerations, better metal can be produced in this manner. In ordinary sintering, maintaining a reducing atmosphere depends on replacing the products of reaction with fresh hydrogen. While this can be done by an excess of hydrogen at the surface, it is impossible to replace the hydrogen rapidly inside of a sizable ingot since the hydrogen must diffuse in and, what is more difficult, the water vapor must diffuse out of the ingot. In our new method of sintering, all this is done before shrinkage has started. Further the dew point of the final hydrogen used can be controlled as desired and does not pick up moisture from any refractory. Because of this, the new method allows production of ingots with lower oxide content. Further impurities such as aluminum, magnesium, iron, and silicon which originate in the refractory furnaces are completely eliminated.

Figure 6:
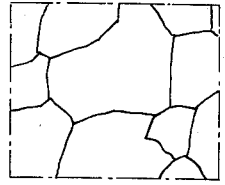
Figure 6 is a photomicrograph, showing the grains of molybdenum, as sintered after doping in accordance with our invention, magnified 250 times.
Figure 8:
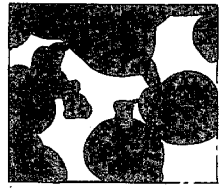
Figure 8 is an electron micrograph, showing the grains of molybdenum powder, as produced from molybdenum dioxide doped with acetic acid, in accordance with our invention, magnified 10,000 times.

Fig. 6 shows that the grains of sintered molybdenum, after doping the compound or powder used in accordance with one of the embodiments of our invention, are much larger than those of molybdenum produced from undoped material. Compare with Fig. 8.

It should not be thought that the molybdenum finally produced by our method, is an alloy with carbon, or a carbide thereof. Our method is designed, not to produce such an alloy or carbide. Rather, most if not all of the carbon will be removed by the sintering process before the metal is worked or used. The advantage is that carbon leaves as carbon monoxide, that is, it takes oxygen with it.

Although preferred embodiments of our invention have been described, it will be understood that modifications may be made.

We claim:

1. The process of manufacturing molybdenum metal in pure dense coherent form, comprising reducing an oxygen-containing molybdenum compound to metal powder by heating, adding to the material, during said process, a water-soluble polar organic compound of a reducing nature volatilizable at about 100° C. and whose composition is limited to carbon, hydrogen and oxygen, pressing to shape, and sintering, first in hydrogen and then in a vacuum, to produce metal the particles of which are free from oxygen and any material proportion of carbon and at least 10% of which are of 2 microns or larger in size.

2. The process of manufacturing molybdenum metal in pure dense coherent form, comprising reducing an oxygen-containing molybdenum compound to metal powder by heating in hydrogen, suspending said powder as a slurry in a solution of a water-soluble polar organic compound of a reducing nature volatilizable at about 100° C. and whose composition is limited to carbon, hydrogen and oxygen, agitating, drying, pressing to shape, and sintering, first in hydrogen and then in a vacuum, to produce metal the particles of which are free from oxygen and any material proportion of carbon and at least 10% of which are of two microns or larger in size.

3. The method of manufacturing molybdenum powder comprising making a slurry of molybdenum dioxide, adding thereto a water-soluble polar carbon-oxygen-hydrogen compound selected from the group consisting of those volatilizable at about 100° C. and where the oxygen atoms are connected to the carbon atoms by a double bond, agitating, drying at about 100° C., and sintering, first in hydrogen by heating for between two and six hours at a temperature between 1100° C. and 800° C. and then in vacuum by heating to a temperature of between 1500° C. and 2400° C. for between one-half and four hours, to produce pure dense metal the particles of which are free from oxygen and any material proportion of carbon and at least 10% of which particles are of two microns or larger in size.

4. The method of manufacturing coherent molybdenum comprising suspending molybdenum dioxide in water to make a slurry, adding thereto about 2 cc. of glacial acetic acid per kilogram of metal in the slurry, agitating, heating to about 100° C. to completely evaporate the water and volatilize the acid, reducing in hydrogen at about 1000° C. for about two hours and in vacuum for about two hours at approximately 1850° C., and screening the metal powder to merely remove gross impurities, pressing, and sintering, to produce metal the particles of which are free from oxygen and any material proportion of carbon and at least 10% of which particles are of two microns or larger in size.

References Cited in the file of this patent

UNITED STATES PATENTS

| | | |
|---|---|---|
| 1,075,563 | Hansen | Oct. 14, 1913 |
| 1,079,777 | Lederer | Nov. 25, 1913 |
| 2,386,544 | Crowley | Oct. 9, 1945 |
| 2,454,322 | Iredell et al. | Nov. 23, 1945 |
| 2,464,517 | Kurtz | Mar. 15, 1949 |
| 2,478,856 | Beaver | Aug. 9, 1949 |
| 2,498,769 | Ramage | Feb. 28, 1950 |
| 2,553,714 | Lucas | May 22, 1951 |
| 2,593,943 | Wainer | Apr. 22, 1952 |

FOREIGN PATENTS

| | | |
|---|---|---|
| 801,060 | France | May 11, 1936 |
| 523,318 | Great Britain | July 11, 1940 |
| 593,562 | Great Britain | Oct. 20, 1947 |
| 616,839 | Great Britain | Jan. 27, 1949 |